(12) United States Patent
Yin

(10) Patent No.: US 12,242,027 B2
(45) Date of Patent: Mar. 4, 2025

(54) OPTICAL LENS ASSEMBLY, CAMERA UNIT AND ELECTRONIC DEVICE

(71) Applicant: BEIJING XIAOMI MOBILE SOFTWARE CO., LTD., Beijing (CN)

(72) Inventor: Zhidong Yin, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 752 days.

(21) Appl. No.: 17/362,615

(22) Filed: Jun. 29, 2021

(65) Prior Publication Data

US 2022/0075160 A1    Mar. 10, 2022

(30) Foreign Application Priority Data

Sep. 9, 2020   (CN) .......................... 202010943293.2

(51) Int. Cl.
  *G02B 13/00*    (2006.01)
  *G02B 5/20*     (2006.01)
  (Continued)

(52) U.S. Cl.
  CPC .............. *G02B 13/00* (2013.01); *G02B 5/208* (2013.01); *G02B 7/09* (2013.01); *G02B 15/142* (2019.08); *G02B 13/0065* (2013.01)

(58) Field of Classification Search
  CPC ........ G02B 9/00; G02B 17/08; G02B 17/086; G02B 17/17; G02B 21/02–04;
  (Continued)

(56) References Cited

U.S. PATENT DOCUMENTS

2015/0177431 A1* 6/2015 Umehara ................. G02B 1/02
                                                             359/361
2015/0215542 A1   7/2015 Nomura et al.
(Continued)

FOREIGN PATENT DOCUMENTS

JP   2005148615 A  *  6/2005   ........... G02B 13/004
JP   2007206544 A     8/2007
(Continued)

OTHER PUBLICATIONS

European Patent Application No. 21182656.5 extended Search and Opinion dated Dec. 13, 2021, 7 pages.
(Continued)

*Primary Examiner* — Stephone B Allen
*Assistant Examiner* — Tamara Y. Washington
(74) *Attorney, Agent, or Firm* — Cozen O'Connor

(57) ABSTRACT

An optical lens assembly includes: a diaphragm, a zoom lens group, a light deflecting assembly and a compensating lens group sequentially arranged along an optical axis and from an object side to an imaging plane. The optical axis comprises a first optical axis segment between the diaphragm and the light deflecting assembly, and a second optical axis segment between the light deflecting assembly and the compensating lens group. The zoom lens group is located on the first optical axis segment, and the first optical axis segment is different from the second optical axis segment. The optical lens assembly may be incorporated in a camera unit and an electronic device.

17 Claims, 4 Drawing Sheets

(51) Int. Cl.
*G02B 7/09* (2021.01)
*G02B 15/14* (2006.01)

(58) Field of Classification Search
CPC .............. G02B 25/00–04; G02B 15/14; G02B 15/143507; G02B 15/142; G02B 23/08; G02B 13/00; G02B 13/0065; G02B 13/009; G02B 13/007; G02B 13/16; G02B 13/06; G02B 5/208; G02B 5/04; G02B 7/09; H04N 5/225; H04N 5/2254; H04N 5/232; H04N 5/23296

See application file for complete search history.

(56) References Cited

U.S. PATENT DOCUMENTS

| | | | |
|---|---|---|---|
| 2015/0253543 A1 | 9/2015 | Mercado | |
| 2015/0288865 A1* | 10/2015 | Osborne | G02B 13/0085 359/823 |
| 2016/0103302 A1* | 4/2016 | Neil | G02B 15/1455 359/670 |
| 2019/0196148 A1* | 6/2019 | Yao | G02B 13/007 |
| 2021/0215859 A1* | 7/2021 | Kim | G02B 5/003 |

FOREIGN PATENT DOCUMENTS

| | | |
|---|---|---|
| JP | 2019101381 A | 6/2019 |
| KR | 20120011239 A | 2/2012 |
| KR | 20160115961 A | 10/2016 |
| KR | 20170045555 A | 4/2017 |

OTHER PUBLICATIONS

Japanese Patent Application No. 2021-097238, Office Action dated Feb. 14, 2023, 6 pages.
Japanese Patent Application No. 2021-097238, English translation of Office Action dated Feb. 14, 2023, 6 pages.
Japanese Patent Application No. 2021-097238, Office Action dated Jul. 26, 2022, 4 pages.
Japanese Patent Application No. 2021-097238, English translation of Office Action dated Jul. 26, 2022, 4 pages.
Korean Patent Application No. 10-2021-0073351, Office Action dated Dec. 5, 2023, 6 pages.
Korean Patent Application No. 10-2021-0073351, English translation of Office Action dated Dec. 5, 2023, 7 pages.
Korean Patent Application No. 10-2021-0073351, Office Action dated Aug. 28, 2024, 7 pages.
Korean Patent Application No. 10-2021-0073351, English translation of Office Action dated Aug. 28, 2024, 9 pages.

* cited by examiner

1000

OPTICAL LENS ASSEMBLY, CAMERA UNIT AND ELECTRONIC DEVICE

CROSS-REFERENCE TO RELATED APPLICATION

This application claims priority to and benefits of Chinese Patent Application Serial No. 202010943293.2, filed with National Intellectual Property Administration of PRC on Sep. 9, 2020, the entire content of which is incorporated herein by reference.

FIELD

The present disclosure relates to a field of electronic technologies, and more particularly to an optical lens assembly, a camera unit and an electronic device.

BACKGROUND

In the related art, an optical lens assembly may be arranged in a camera unit, and the camera unit may be mounted on an electronic device, so as to provide a corresponding image capture function for the electronic device. For example, in electronic devices such as mobile phones, a telephoto camera units have achieved a 10× optical zoom. It is also known to include a periscope camera with a 5× optical zoom in mobile phones. Users' demands for a greater range in image capture continue to increase. Current optical zoom schemes mainly rely on switching back and forth between camera units with different focal lengths. Since the periscope is placed in front, a diaphragm (aperture) of an optical system is arranged behind the periscope, and thus, a size of the aperture is constrained due to the limitation of the thickness of the mobile phone. This results in poor effects such as a small amount of incoming light and a low diffraction limit of light.

SUMMARY

According to a first aspect of embodiments of the present disclosure, an optical lens assembly is provided, including a diaphragm, a zoom lens group, a light deflecting assembly and a compensating lens group sequentially arranged along an optical axis and from an object side to an imaging plane. The optical axis includes a first optical axis segment between the diaphragm and the light deflecting assembly, and a second optical axis segment between the light deflecting assembly and the compensating lens group. The zoom lens group is located on the first optical axis segment; and the first optical axis segment is different from the second optical axis segment.

According to a second aspect of the embodiments of the present disclosure, a camera unit is provided, including an optical lens assembly and an image sensor. The optical lens assembly includes a diaphragm, a zoom lens group, a light deflecting assembly and a compensating lens group sequentially arranged along an optical axis and from an object side to an imaging plane. The optical axis includes a first optical axis segment between the diaphragm and the light deflecting assembly, and a second optical axis segment between the light deflecting assembly and the compensating lens group. The zoom lens group is located on the first optical axis segment; and the first optical axis segment is different from the second optical axis segment. The image sensor is located at a side of the compensating lens group away from the light deflecting assembly.

According to a third aspect of the embodiments of the present disclosure, an electronic device is provided, including a camera unit and a display screen. The camera unit includes an optical lens assembly and an image sensor. The optical lens assembly includes a diaphragm, a zoom lens group, a light deflecting assembly and a compensating lens group sequentially arranged along an optical axis and from an object side to an imaging plane. The optical axis includes a first optical axis segment between the diaphragm and the light deflecting assembly, and a second optical axis segment between the light deflecting assembly and the compensating lens group. The zoom lens group is located on the first optical axis segment; and the first optical axis segment is different from the second optical axis segment. The image sensor is located at a side of the compensating lens group away from the light deflecting assembly. The display screen is parallel to the diaphragm.

BRIEF DESCRIPTION OF THE DRAWINGS

The accompanying drawings herein are incorporated in and constitute a part of the specification, show embodiments that conform to the present disclosure, and serve to explain the principles of the present disclosure in conjunction with the specification.

DETAILED DESCRIPTION

Figure 1:
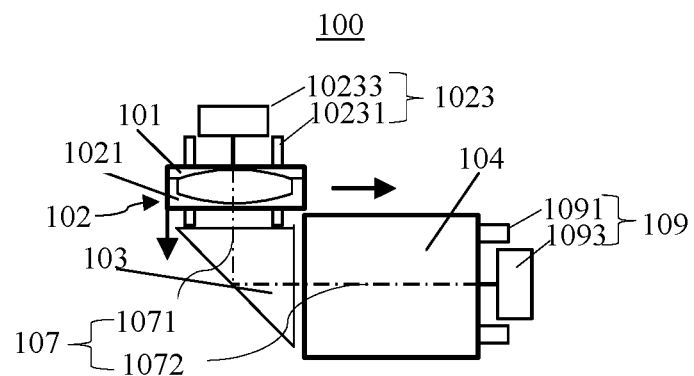
FIG. 1 is a schematic structural diagram of an optical lens assembly according to an exemplary embodiment.

Exemplary embodiments will be described in detail herein, with examples thereof represented in the drawings. When the following descriptions involve the drawings, like numerals in different drawings represent like or similar elements unless otherwise indicated. Implementations described in the following exemplary embodiments do not represent all implementations consistent with the present disclosure. Instead, they are merely examples of apparatuses and methods consistent with some aspects of the present disclosure as detailed in the appended claims.

FIG. 1 is a first schematic structural diagram of an optical lens assembly 100 according to an exemplary embodiment. As illustrated in FIG. 1, the optical lens assembly 100 may include a diaphragm 101, a zoom lens group 102, a light deflecting assembly 103 and a compensating lens group 104 sequentially arranged along an optical axis 107 and from an object side to an imaging plane. The optical axis 107 includes a first optical axis segment 1071 between the diaphragm 101 and the light deflecting assembly 103, and the zoom lens group 102 is located on the first optical axis segment 1071. The optical axis 107 includes a second optical axis segment 1072 between the light deflecting assembly 103 and the compensating lens group 104. The first optical axis segment 1071 is different from the second optical axis segment 1072.

Here, the diaphragm may be an element configured to constrain and confine incident light. For example, it may be a frame with a set size arranged at a front end of the zoom lens group or the like. In some embodiments, the light deflecting assembly may be a prism or any other devices that change a direction of propagation of the incident light. In some embodiments, the light deflecting assembly may include a triangular prism. Here, the triangular prism is a transparent body with a triangular cross section in optics, and is an optical instrument with a triangular cross section made of a transparent material. In some other embodiments, the light deflecting assembly may also be a prism in other shapes, for example, a quadrangular prism, a pentagonal prism, etc., which is not specifically limited herein.

During implementation, the incident light may be transmitted through the diaphragm to the zoom lens group. The zoom lens group, after receiving the incident light, may transmit the incident light to the light deflecting assembly. The light deflecting assembly, after receiving the incident light, may deflect the incident light to the compensating lens group.

In an embodiment of the present disclosure, the first optical axis segment is defined between the diaphragm and the light deflecting assembly, and the zoom lens group is located on the first optical axis segment. That is, the diaphragm and the light deflecting assembly are located at two sides of the zoom lens group. In an embodiment of the present disclosure, the optical axis may be a line passing through a lens center of the zoom lens group and a lens center of the compensating lens group. The first optical axis segment may be a line segment starting at the diaphragm, ending at the light deflecting assembly, passing through the lens center of the zoom lens group and perpendicular to a light incident surface of the zoom lens group. The second optical axis segment may be a line segment starting at the light deflecting assembly, ending at the compensating lens group, passing through the lens center of the compensating lens group and perpendicular to a light incident surface of the compensating lens group.

In some embodiments, the compensating lens group and the zoom lens group may be located at different sides of the light deflecting assembly when the light deflecting assembly has multiple sides. For example, the compensating lens group may be located at a first side of the light deflecting assembly, the zoom lens group may be located at a second side of the light deflecting assembly, and the first side and the second side are perpendicular to each other. Moreover, since the compensating lens group is located on the second optical axis segment and the zoom lens group is located on the first optical axis segment, the first optical axis segment and the second optical axis segment are also perpendicular to each other in a case where the first side and the second side of the light deflecting assembly are perpendicular to each other.

In another example, the compensating lens group may be located at the first side of the light deflecting assembly, the zoom lens group may be located at the second side of the light deflecting assembly, and the first side and the second side are at an angle of 50 degrees. Moreover, since the compensating lens group is located on the second optical axis segment and the zoom lens group is located on the first optical axis segment, the first optical axis segment and the second optical axis segment are also at an angle of 50 degrees in a case where the first side and the second side of the light deflecting assembly are at an angle of 50 degrees. In some other embodiments, a relationship between the first side and the second side may be determined based on a shape of the light deflecting assembly, which is not specifically limited herein.

In some embodiments, a plurality of compensating lenses may be arranged in the compensating lens group. The plurality of compensating lenses are each a simple lens, and the plurality of compensating lenses can define a set optical transmission path. Incident light can be transmitted along the set optical transmission path after entering the compensating lens group. In some other embodiments, the compensating lens group may consist of a single convex or concave lens. In some other embodiments, the compensating lens group may also be composed of a combination of convex and concave lenses.

For example, the compensating lens group may include a first compensating lens, a second compensating lens and a third compensating lens. A light incident surface and a light emitting surface of the first compensating lens are both convex; a light incident surface of the second compensating lens is convex, and a light emitting surface of the second compensating lens is concave; and a light incident surface and a light emitting surface of the third compensating lens are both concave. During implementation, the set optical transmission path may be defined by the first compensating lens, the second compensating lens and the third compensating lens. The incident light can be transmitted along the set optical transmission path after entering the compensating lens group.

In some other embodiments, the compensation lens group may be moved to compensate for incident light output from the light deflecting assembly to assist the zoom lens group in zooming. Here, in order to keep the set optical transmission path unchanged, the compensating lenses in the compensating lens group can be moved simultaneously. For example, when the incident light is relatively divergent, it can focus more divergent light to improve the quality of a formed target image.

Figure 2A:
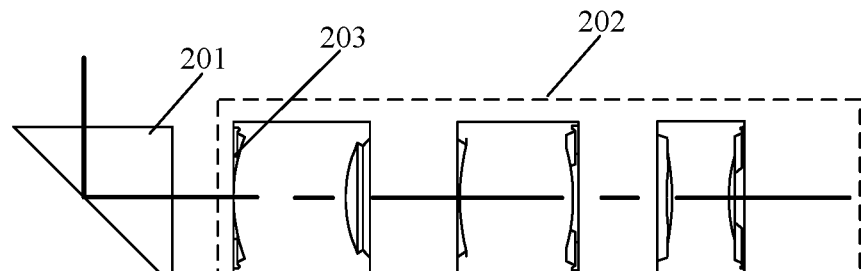
FIG. 2A is a schematic structural diagram of an optical lens assembly in a 3× zoom mode in the related art.
Figure 2B:
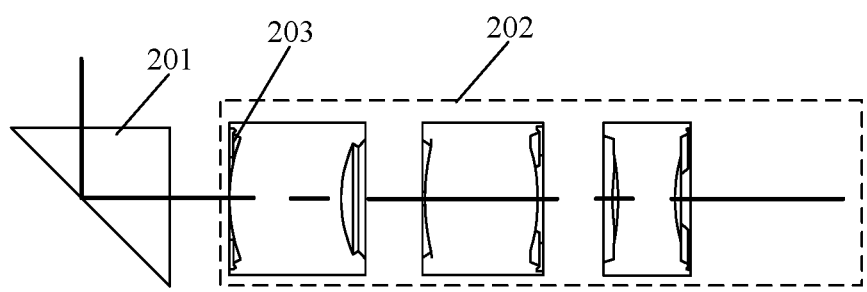
FIG. 2B is a schematic structural diagram of an optical lens assembly in a 4× zoom mode in the related art.
Figure 2C:
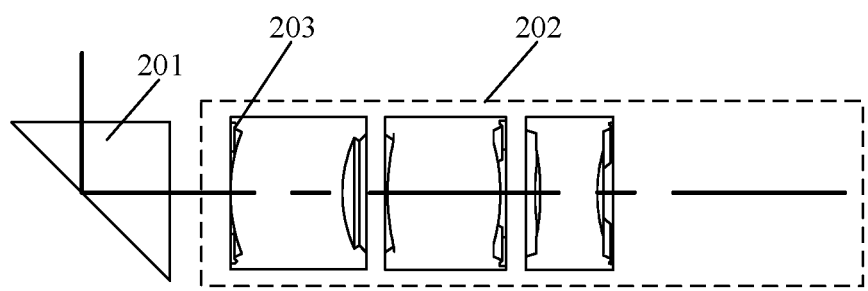
FIG. 2C is a schematic structural diagram of an optical lens assembly in a 5× zoom mode in the related art.

FIG. 2A is a schematic structural diagram of an optical lens assembly in a 3× zoom mode in the related art, FIG. 2B is a schematic structural diagram of the optical lens assembly in a 4× zoom mode in the related art, and FIG. 2C is a schematic structural diagram of the optical lens assembly in a 5× zoom mode in the related art. As illustrated in FIGS. 2A to 2C, a prism 201 is arranged at a front end of an entire optical system 200 in the related art. In this way, since lenses in the optical system 202 are required to be placed vertically and a diaphragm (aperture) 203 is located at a front end of the optical system, a thickness of an electronic device is required to be increased if the aperture is to be made large in a case where the diaphragm 203 is perpendicular to a display screen of the electronic device, to provide enough space for the aperture, but this may make the electronic device very thick.

In an embodiment of the present disclosure, compared with the technical solution in FIGS. 2A to 2C, the diaphragm is located closest to the object side by arranging the zoom lens group between the diaphragm and the light deflecting assembly, so that the incident light needs to pass through the diaphragm before entering the zoom lens group and the light deflecting assembly. Since the diaphragm is located closest to the object side and located at the forefront end of the entire optical lens assembly, a size of the diaphragm can be increased without correspondingly increasing sizes of other assemblies. This may allow the size of the diaphragm to be increased as needed, to increase the amount of incoming light and a diffraction limit of light without being limited by the sizes of the other assemblies.

In some embodiments, the light deflecting assembly includes a light incident surface perpendicular to the first optical axis segment, and a light emitting surface perpendicular to the second optical axis segment.

Figure 3:
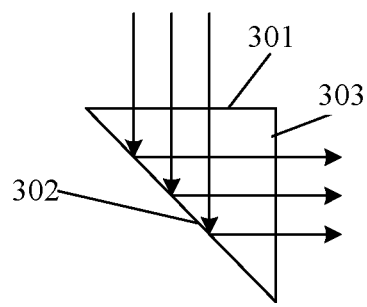
FIG. 3 is a schematic diagram of a cross-sectional structure of a triangular prism according to an exemplary embodiment.

FIG. 3 is a schematic diagram of a cross-sectional structure of a triangular prism according to an exemplary embodiment. As illustrated in FIG. 3, the triangular prism may include a light incident surface 301, a light deflecting surface 302 and a light emitting surface 303. During implementation, incident light may be received based on the light incident surface of the triangular prism. After being received, the incident light is reflected based on the light deflecting surface, to change a transmission direction of the incident light, and then the incident light with the changed transmission direction is output based on the light emitting surface.

In some embodiments, the light incident surface of the triangular prism may be perpendicular to the light emitting surface, and the light deflecting surface 302 forms an angle of 45 degrees with the light incident surface and the light emitting surface respectively. In this way, when the triangular prism receives the incident light perpendicular to the light incident surface 301, a direction of the incident light can be changed into a direction parallel to the light incoming surface 301 after passing through the triangular prism.

For example, the diaphragm is located in an XOY plane of a Cartesian coordinate system. During implementation, if necessary, the size of the diaphragm may be increased by only occupying more area in the XOY plane, without increasing a height of a Z axis. In this way, the thickness of the electronic device may not be increased in a case where the display screen of the electronic device is also located in the XOY plane of the Cartesian coordinate system.

In an embodiment of the present disclosure, the diaphragm and the zoom lens group may be arranged at a side of the light incident surface of the light deflecting assembly. Since the diaphragm is located at the front end of the light deflecting assembly, the size of the diaphragm can be increased as needed without increasing the thickness of the electronic device.

In some embodiments, the light incident surface of the light deflecting assembly is perpendicular to the light emitting surface of the light deflecting assembly. In some embodiments, in a case where the optical lens assembly is applied to an electronic device with a display screen, the light incident surface of the light deflecting assembly may be parallel to the display screen of the electronic device, and the light emitting surface of the light deflecting assembly may be perpendicular to a light emitting surface of the display screen of the electronic device.

In some other embodiments, a light incident surface of the diaphragm configured to receive incident light is parallel to the light incident surface of the light deflecting assembly. Thus, the light incident surface of the diaphragm is enabled to be parallel to the display screen of the electronic device, and the thickness of the electronic device will not increase when the size of the diaphragm needs to be increased.

In some embodiments, a first lens optical axis 1025 of the zoom lens group is perpendicular to a second lens optical axis 1041 of the compensating lens group. In an embodiment of the present disclosure, the first lens optical axis of the zoom lens group is perpendicular to the second lens optical axis of the compensating lens group, so that when the light incident surface of the light deflecting assembly is perpendicular to the light emitting surface of the light deflecting assembly, the incident light deflected by the light deflecting assembly can be successfully deflected to the compensating lens group, and an optical zoom function of the camera unit can be realized by moving the compensating lens group.

In some embodiments, the zoom lens group includes at least one zoom lens 1021 and a first drive assembly 1023 connected to the at least one zoom lens. A first lens optical axis defined by an optical center of the at least one zoom lens is located on a same straight line as the first optical axis segment.

Here, zoom lenses in the zoom lens group are sequentially arranged along the first lens optical axis of the zoom lens group, and the zoom lenses are spaced apart from one another. In some embodiments, optical centers of a plurality of zoom lenses are located on the same straight line, which can form the first lens optical axis of the zoom lens group. During implementation, a distance between any two adjacent zoom lenses may be changed. In an embodiment of the present disclosure, a focal length of the camera unit can be adjusted by changing the distance between any two adjacent zoom lenses in the plurality of zoom lenses.

Here, the first drive assembly may include a guide rail 10231 parallel to the first lens optical axis. The plurality of zoom lenses are slidably connected to the guide rail. The first drive assembly may include a drive motor 10233, such as a linear motor or a rotor motor. In an embodiment of the present disclosure, the zoom lens group is provided with the first drive assembly, so that the zoom lens can be driven to move by the first drive assembly, to realize optical zoom of the camera unit.

In some embodiments, the camera unit further includes a second drive assembly 109 connected to the compensating lens group. A second lens optical axis of the compensating lens group is located on a same straight line as the second optical axis segment.

In some other embodiments, the compensation lens group may be moved to compensate for incident light output from the light deflecting assembly to assist the zoom lens group in zooming. Here, in order to keep the set optical transmission path unchanged, the compensating lenses in the compensating lens group can be moved simultaneously. For example, in a case where the incident light is relatively divergent, it can focus more divergent light to improve the quality of a formed target image.

Figure 4:
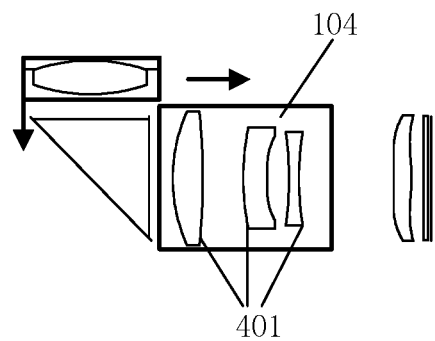
FIG. 4 is a schematic structural diagram of a compensating lens group according to an exemplary embodiment.

FIG. 4 is a schematic structural diagram of a compensating lens group according to an exemplary embodiment. As illustrated in FIG. 4, a compensating lens group 104 may have a plurality of lenses 401.

Here, the second drive assembly may include a guide rail 1091 parallel to the second lens optical axis. The compensating lens group is slidably connected to the guide rail. The second drive assembly may include a drive motor 1093, such as a linear motor or a rotor motor. In an embodiment of the present disclosure, the compensating lens group is provided with the second drive assembly, so that the compensating lens group can be driven to move by the second drive assembly, to compensate for the incident light and realize optical zoom in conjunction with the zoom lens group.

In some embodiments, the diaphragm includes a light-transmitting hole having a diameter greater than or equal to a maximum diameter of a zoom lens included in the zoom lens group. Here, the diaphragm is provided with the light-transmitting hole having a diameter greater than or equal to the maximum diameter of the zoom lens included in the zoom lens group, so that the amount of light entering the zoom lens groups can be increased.

Figure 5A:
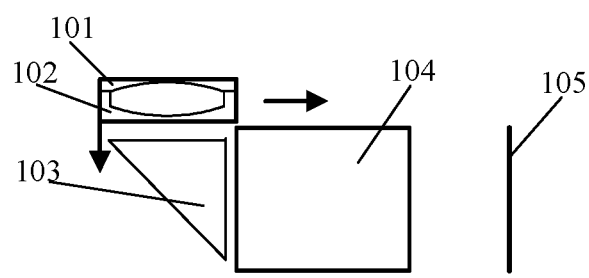
FIG. 5A is a schematic structural diagram of a camera unit with an optical lens assembly according to an exemplary embodiment.

FIG. 5A is a schematic structural diagram of a camera unit 1000 according to an exemplary embodiment. As illustrated in FIG. 5A, the camera unit includes an optical lens assembly, and further includes an image sensor 105 located at a side of the compensating lens group of the optical lens assembly away from the light deflecting assembly.

In an embodiment of the present disclosure, the image sensor is arranged at a side of the compensating lens group away from the light deflecting assembly, to receive incident light output by the compensating lens group 104 and form a target image by the image sensor.

In some embodiments, the camera unit further includes a filtering assembly 501 located between the compensating lens group and the image sensor.

Figure 5B:
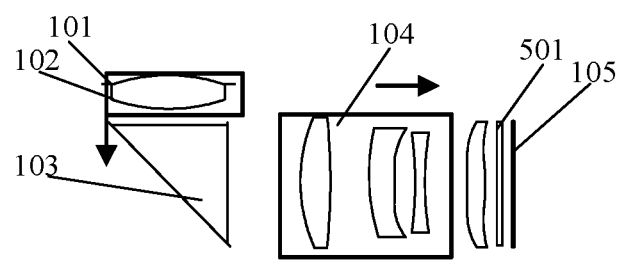
FIG. 5B is another schematic structural diagram of a camera unit with an optical lens assembly according to an exemplary embodiment.

FIG. 5B is another schematic structural diagram of the camera unit with an optical lens assembly according to an exemplary embodiment. As illustrated in FIG. 5B, the filtering assembly 501 is located between the compensating lens group 104 and the image sensor 105.

Here, the filtering assembly may be configured to filter light at a set band. In some embodiments, the camera unit may further include: a filtering assembly for filtering out infrared light located at a side of the light emitting surface of the compensating lens group. In an embodiment of the present disclosure, a filtering assembly may be arranged between the compensating lens group and the image sensor to filter out infrared light. For example, an infrared filter is arranged between the compensating lens group and the image sensor. Here, the infrared light can be filtered through an infrared filtering assembly to avoid the detection of invisible light by the image sensor which forms ghosting or flare during imaging and affects the imaging quality.

In some embodiments, the camera unit further includes a light-transmitting cover plate located at a side of the diaphragm facing away from the zoom lens group.

Figure 6:
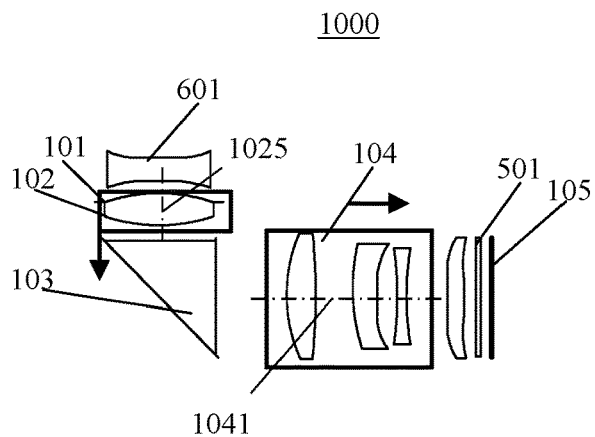
FIG. 6 is a further schematic structural diagram of a camera unit with an optical lens assembly according to an exemplary embodiment.

FIG. 6 is a further schematic structural diagram of the camera unit with an optical lens assembly according to an exemplary embodiment. As illustrated in FIG. 6, a light-transmitting cover plate 601 may be arranged at a side of the diaphragm 101 facing away from the zoom lens group 102. The light-transmitting cover plate can be waterproof and dustproof to protect structures of assemblies inside the camera unit from damages.

Figure 7A:
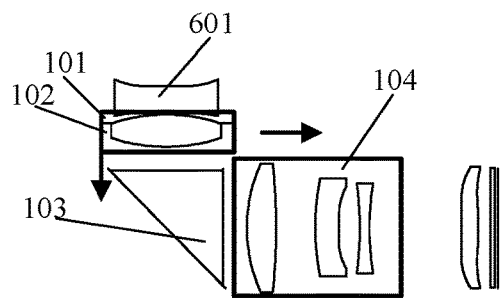
FIG. 7A is a schematic structural diagram of a camera unit in a 3× zoom mode according to an exemplary embodiment.
Figure 7B:
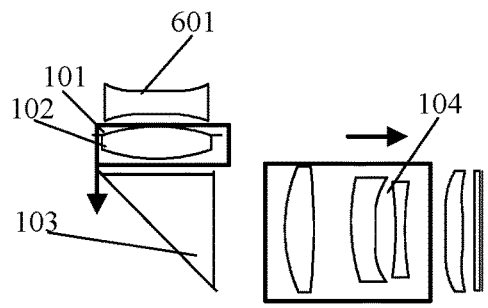
FIG. 7B is a schematic structural diagram of a camera unit in a 4× zoom mode according to an exemplary embodiment.
Figure 7C:
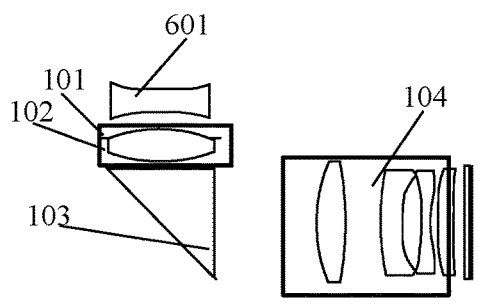
FIG. 7C is a schematic structural diagram of a camera unit in a 5× zoom mode according to an exemplary embodiment.

FIG. 7A is a schematic structural diagram of the camera unit in a 3× zoom mode according to an exemplary embodiment, FIG. 7B is a schematic structural diagram of the camera unit in a 4× zoom mode according to an exemplary embodiment, and FIG. 7C is a schematic structural diagram of the camera unit in a 5× zoom mode according to an exemplary embodiment. As illustrated in FIGS. 7A to 7C, in an embodiment of the present disclosure, the diaphragm 101 is arranged at a front end of the zoom lens group 102, and the compensating lens groups 104 in FIGS. 7A to 7C are located at different positions respectively. That is, the zoom lens in the zoom lens group can move in a first direction, and the compensating lens group can move in a second direction. The first direction may be a direction of the first lens optical axis of the zoom lens group, which may be an up-down direction as illustrated. The second direction may be a direction of the second lens optical axis of the compensating lens group, which may be a left-right direction as illustrated. In an embodiment of the present disclosure, a user can make the diaphragm large as needed without being limited by sizes of the lens in the zoom lens group and the light deflecting assembly, which can increase the amount of incoming light and a diffraction limit of light.

In some embodiments, the electronic device is provided with the camera unit according to any one of the above embodiments.

In an embodiment of the present disclosure, the camera unit may be arranged in an electronic device. The electronic device may include a mobile terminal and a fixed terminal. The mobile terminal may include a mobile phone, a laptop computer, a tablet computer, a wearable electronic device, and the like. The fixed terminal may include a personal computer device, a monitoring device, a medical device, and the like. The electronic device involved in an embodiment of the present disclosure includes a display unit. The display unit may be a display screen of the electronic device. In a case where the electronic device includes a display screen, the light incident surface of the light deflecting assembly may be parallel to the display screen of the electronic device, and the light emitting surface of the light deflecting assembly may be perpendicular to the display screen of the electronic device.

Figure 8:
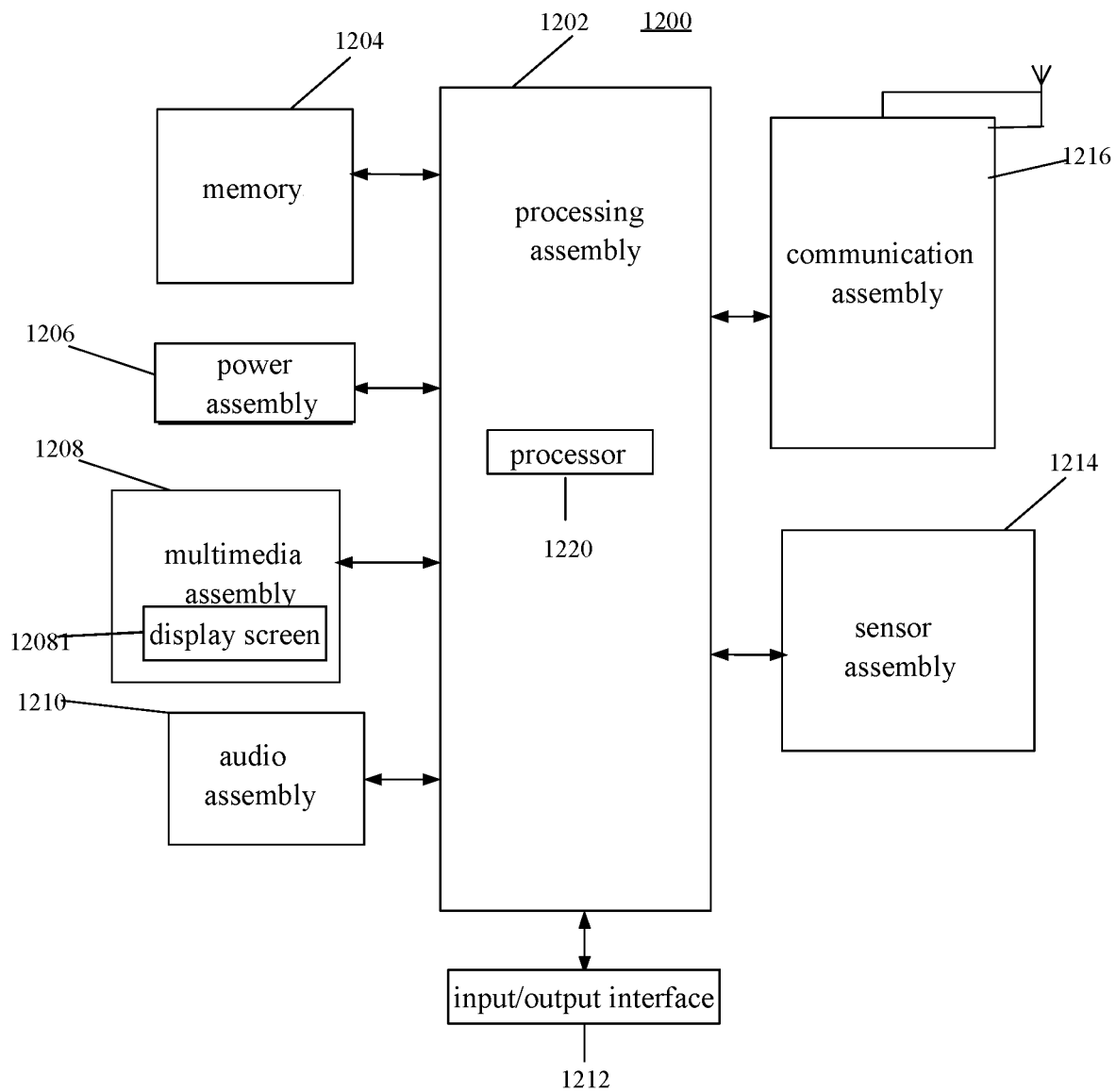
FIG. 8 is a block diagram of a hardware structure of an electronic device according to an exemplary embodiment.

FIG. 8 is a block diagram of a hardware structure of an electronic device according to an exemplary embodiment. For example, the electronic device 1200 may be a mobile phone, a computer, a digital broadcast terminal, a messaging device, a gaming console, a tablet device, a medical device, exercise equipment, a personal digital assistant, or the like.

Referring to FIG. 8, the electronic device 1200 may include one or more of the following assemblies: a processing assembly 1202, a memory 1204, a power assembly 1206, a multimedia assembly 1208, an audio assembly 1210, an input/output (I/O) interface 1212, a sensor assembly 1214, and a communication assembly 1216.

The processing assembly 1202 may control overall operations of the electronic device 1200, such as operations relating to display, telephone calls, data communications, camera operations and recording operations. The processing assembly 1202 may include one or more processors. In addition, the processing assembly 1202 may include one or more units that facilitate interaction between the processing assembly 1202 and other assemblies. For example, the processing assembly 1202 may include a multimedia unit to facilitate interaction between the multimedia assembly 1208 and the processing assembly 1202.

The memory 1204 may be configured to store various types of data to support the operations of the electronic device 1200. For example, the data includes instructions for any application or method to operate on the electronic device 1200, contact data, phonebook data, messages, pictures, videos, and the like. The memory 1204 may be implemented using any type of volatile or non-volatile memory device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power assembly 1206 may provide power to various assemblies of the electronic device 1200. The power assembly 1206 may include a power management system, one or more power supplies, and other assemblies relating to the generation, management and distribution of power for the electronic device 1200.

The multimedia assembly 1208 includes a screen providing an output interface between the electronic device 1200 and the user. In some embodiments, the screen may include a liquid crystal display (LCD) and a touch panel (TP). If the screen includes the touch panel, the screen may be implemented as a touch screen to receive an input signal from the user. The touch panel includes one or more touch sensors to sense touches, swipes, and gestures on the touch panel. The touch sensor may not only sense boundaries of a touch or swipe action, but also detect a period of time and a pressure associated with the touch or swipe action. In some embodiments, the multimedia assembly 1208 includes a front camera and/or a rear camera. The front camera and/or the rear camera may receive external multimedia data when the electronic device 1200 is in an operation mode, such as a photographing mode or a video mode. Each of the front camera and the rear camera may include a fixed optical lens assembly system or have focus and optical zoom capability.

The audio assembly 1210 is configured to output and/or input an audio signal. For example, the audio assembly 1210 includes a microphone (MIC) configured to receive an external audio signal when the electronic device 1200 is in an operation mode such as a call mode, a recording mode, or a voice recognition mode. The received audio signal may be further stored in the memory 1204 or transmitted via the communication assembly 1216. In some embodiments, the audio assembly 1210 further includes a speaker configured to output an audio signal.

The I/O interface 1212 may provide an interface between the processing assembly 1202 and a peripheral interface unit, such as a keyboard, a click wheel, a button, or the like. The buttons may include, but are not limited to, a home button, a volume button, a starting button and a locking button.

The sensor assembly 1214 may include one or more sensors configured to provide status assessments of various aspects of the electronic device 1200. For example, the sensor assembly 1214 may detect an ON/OFF status of the electronic device 1200 and relative positions of assemblies (e.g., a display and a keypad of the electronic device 1200). The sensor assembly 1214 may further detect a change in a position of the electronic device 1200 or an assembly of the electronic device 1200, presence or absence of the user's contact with the electronic device 1200, an orientation or an acceleration/deceleration of the electronic device 1200, and a change in a temperature of the electronic device 1200. The sensor assembly 1214 may include a proximity sensor configured to detect the presence of nearby object without any physical contact with such object. The sensor assembly 1214 may also include a light sensor, such as a CMOS or CCD image sensor, for use in imaging applications. In some embodiments, the sensor assembly 1214 may also include an accelerometer sensor, a gyroscope sensor, a magnetic sensor, a pressure sensor, or a temperature sensor.

The communication assembly 1216 is configured to facilitate wired or wireless communications between the electronic device 1200 and other devices. The electronic device 1200 may be connected to a wireless network based on a communication standard, such as WiFi, 2G, or 6G, or a combination thereof. In an exemplary embodiment, the communication assembly 1216 receives a broadcast signal or broadcast related information from an external broadcast management system via a broadcast channel. In an exemplary embodiment, the communication assembly 1216 further includes a near field communication (NFC) unit to facilitate short-range communications. For example, the NFC unit may be implemented based on a radio frequency identification (RFID) technology, an infrared data association (IrDA) technology, an ultra-wideband (UWB) technology, a Bluetooth (BT) technology, or other technologies.

In exemplary embodiments, the electronic device 1200 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements.

In exemplary embodiments, a non-transitory computer-readable storage medium including instructions is further provided, such as the memory 1204 including instructions. For example, the non-transitory computer-readable storage medium may be a ROM, a random access memory (RAM), a compact disc read-only memory (CD-ROM), a magnetic tape, a floppy disc, an optical data storage device, or the like.

Other implementation solutions of the present disclosure will be apparent to those skilled in the art from consideration of the specification and practice disclosed herein. The present disclosure is intended to cover any variations, uses, or adaptations of the present disclosure following the general principles of the present disclosure and including common knowledge or common technical means in the art not disclosed in the present disclosure. It is intended that the specification and embodiments be considered as exemplary only, with a true scope and spirit of the present disclosure being indicated by the appended claims.

It should be understood that the present disclosure is not limited to the exact construction that has been described above and illustrated in the accompanying drawings and that various modifications and changes can be made without departing from the scope thereof. The scope of the present disclosure is limited only by the appended claims.

What is claimed is:

1. An optical lens assembly, comprising:
a diaphragm, a zoom lens group, a light deflecting assembly and a compensating lens group sequentially arranged along an optical axis and from an object side to an imaging plane;
wherein the optical axis comprises a first optical axis segment between the diaphragm and the light deflecting assembly, and a second optical axis segment between the light deflecting assembly and the compensating lens group; the zoom lens group is located on the first optical axis segment, and the first optical axis segment is different from the second optical axis segment;
wherein the compensating lens group comprises a first compensating lens, a second compensating lens and a third compensating lens; a light incident surface and a light emitting surface of the first compensating lens are both convex; a light incident surface of the second compensating lens is convex, and a light emitting surface of the second compensating lens is concave; and a light incident surface and a light emitting surface of the third compensating lens are both concave, and
wherein the second compensating lens is located between the first compensating lens and the third compensating lens, and the first compensating lens, the second compensating lens and the third compensating lens are arranged adjacently.

2. The optical lens assembly according to claim 1, wherein a light incident surface of the diaphragm configured to receive incident light is parallel to the light incident surface of the light deflecting assembly.

3. The optical lens assembly according to claim 1, wherein the zoom lens group comprises:
   at least one zoom lens; and
   a first drive assembly connected to the at least one zoom lens;
   wherein a first lens optical axis defined by an optical center of the at least one zoom lens is located on a same straight line as the first optical axis segment.

4. The optical lens assembly according to claim 3, wherein zoom lenses in the zoom lens group are sequentially arranged along the first lens optical axis of the zoom lens group, the zoom lenses are spaced apart from one another, and a distance between any two adjacent zoom lenses is changeable.

5. The optical lens assembly according to claim 3, wherein the first drive assembly comprises a guide rail parallel to the first lens optical axis, and zoom lenses in the zoom lens group are slidably connected to the guide rail.

6. The optical lens assembly according to claim 1, further comprising:
   a second drive assembly connected to the compensating lens group;
   wherein a second lens optical axis of the compensating lens group is located on a same straight line as the second optical axis segment.

7. The optical lens assembly according to claim 6, wherein compensating lenses in the compensating lens group is movable along the second lens optical axis simultaneously.

8. The optical lens assembly according to claim 6, wherein the second drive assembly comprises a guide rail parallel to the second lens optical axis, and the compensating lens group is slidably connected to the guide rail.

9. The optical lens assembly according to claim 1, wherein the diaphragm comprises a light-transmitting hole having a diameter greater than or equal to a maximum diameter of a zoom lens comprised in the zoom lens group.

10. The optical lens assembly according to claim 1, wherein the light deflecting assembly comprise a triangular prism.

11. The optical lens assembly according to claim 10, wherein the triangular prism comprises a light incident surface, a light deflecting surface and a light emitting surface; the light incident surface is perpendicular to the light emitting surface, and the light deflecting surface is at an angle of 45 degrees with each of the light incident surface and the light emitting surface.

12. A camera unit, comprising:
   an optical lens assembly comprising a diaphragm, a zoom lens group, a light deflecting assembly and a compensating lens group sequentially arranged along an optical axis and from an object side to an imaging plane; and
   an image sensor located at a side of the compensating lens group away from the light deflecting assembly,
   wherein the optical axis defines a first optical axis segment between the diaphragm and the light deflecting assembly, and a second optical axis segment between the light deflecting assembly and the compensating lens group; the zoom lens group is located on the first optical axis segment, and the first optical axis segment is different from the second optical axis segment;
   wherein the compensating lens group comprises a first compensating lens, a second compensating lens and a third compensating lens; a light incident surface and a light emitting surface of the first compensating lens are both convex; a light incident surface of the second compensating lens is convex, and a light emitting surface of the second compensating lens is concave; and a light incident surface and a light emitting surface of the third compensating lens are both concave, and
   wherein the second compensating lens is located between the first compensating lens and the third compensating lens, and the first compensating lens, the second compensating lens and the third compensating lens are arranged adjacently.

13. The camera unit according to claim 12, wherein the camera unit further comprises a filtering assembly located between the compensating lens group and the image sensor.

14. The camera unit according to claim 13, wherein the filtering assembly comprises an infrared filter.

15. The camera unit according to claim 12, wherein the camera unit further comprises a light-transmitting cover plate located at a side of the diaphragm facing away from the zoom lens group.

16. An electronic device, comprising:
   a camera unit comprising:
      an optical lens assembly comprising a diaphragm, a zoom lens group, a light deflecting assembly and a compensating lens group sequentially arranged along an optical axis and from an object side to an imaging plane; and
      an image sensor located at a side of the compensating lens group away from the light deflecting assembly,
      wherein the optical axis defines a first optical axis segment between the diaphragm and the light deflecting assembly, and a second optical axis segment between the light deflecting assembly and the compensating lens group; the zoom lens group is located on the first optical axis segment, and the first optical axis segment is different from the second optical axis segment; and
   a display screen parallel to the diaphragm;
   wherein the compensating lens group comprises a first compensating lens, a second compensating lens and a third compensating lens; a light incident surface and a light emitting surface of the first compensating lens are both convex; a light incident surface of the second compensating lens is convex, and a light emitting surface of the second compensating lens is concave; and a light incident surface and a light emitting surface of the third compensating lens are both concave, and
   wherein the second compensating lens is located between the first compensating lens and the third compensating lens, and the first compensating lens, the second compensating lens and the third compensating lens are arranged adjacently.

17. The electronic device according to claim 16, wherein the light deflecting assembly comprises a light incident surface perpendicular to the first optical axis segment, and a light emitting surface perpendicular to the second optical axis segment; the light deflecting assembly is parallel to the display screen, and the emitting surface is perpendicular to the display screen.

* * * * *